United States Patent
Freisinger

(10) Patent No.: US 11,346,450 B2
(45) Date of Patent: May 31, 2022

(54) POPPET VALVE WITH SIMULTANEOUSLY CONTACTING VALVE MEMBERS

(71) Applicant: Automatic Switch Company, Florham Park, NJ (US)

(72) Inventor: Paul W. Freisinger, Stockholm, NJ (US)

(73) Assignee: AUTOMATIC SWITCH COMPANY, Florham Park, NJ (US)

( * ) Notice: Subject to any disclaimer, the term of this patent is extended or adjusted under 35 U.S.C. 154(b) by 0 days.

(21) Appl. No.: 16/737,814

(22) Filed: Jan. 8, 2020

(65) Prior Publication Data
US 2021/0207716 A1 Jul. 8, 2021

(51) Int. Cl.
F16K 1/32 (2006.01)
F16K 27/02 (2006.01)

(52) U.S. Cl.
CPC .............. *F16K 1/32* (2013.01); *F16K 27/02* (2013.01); *Y10T 137/0491* (2015.04); *Y10T 137/6065* (2015.04)

(58) Field of Classification Search
CPC ... F16K 1/32; F16K 27/02; F16K 1/44; F16K 1/443; F16K 1/48; F16K 1/482; F16K 1/487; Y10T 137/0491; Y10T 137/6065
See application file for complete search history.

(56) References Cited

U.S. PATENT DOCUMENTS

| | | | | |
|---|---|---|---|---|
| 58,600 A | * | 10/1866 | Coffin | F16K 27/02 251/155 |
| 72,458 A | * | 12/1867 | Crossley | F16K 27/02 251/225 |
| 220,202 A | * | 9/1879 | Wilder | G05D 16/0661 137/505.39 |
| 427,326 A | * | 5/1890 | Jenkins | F16K 1/482 251/86 |
| 967,820 A | * | 8/1910 | Nachtigall | F16K 1/46 137/630.19 |
| 1,567,030 A | * | 12/1925 | Bryant | F16K 1/44 137/271 |

(Continued)

FOREIGN PATENT DOCUMENTS

| DE | 1057408 B | 5/1959 |
|---|---|---|
| EP | 1256706 A2 | 11/2002 |
| GB | 1516629 A | 7/1978 |

OTHER PUBLICATIONS

PCT Application No. PCT/US2021/012546—International Search Report and Written Opinion dated Apr. 13, 2021.

*Primary Examiner* — Jessica Cahill
(74) *Attorney, Agent, or Firm* — Mackey Law Firm PLLC

(57) ABSTRACT

A poppet assembly for a valve can include a valve stem for cooperating with a valve actuator, a first valve member coupled to the valve stem in a fixed position and configured to sealingly engage a first orifice and a second valve member coupled to the valve stem and configured to sealingly engage a second orifice. The second valve member can include a coupler for coupling the second valve member to the valve stem and a seal configured to couple to the coupler and the valve stem. The second valve member can be configured for achieving proper spacing between the valve members for simultaneous contact with their respective orifices without the need for more costly and time consuming components or assembly methods.

18 Claims, 2 Drawing Sheets

(56) References Cited

U.S. PATENT DOCUMENTS

| | | | | |
|---|---|---|---|---|
| 1,733,528 | A | * | 10/1929 | Davis .................... G05D 16/18 |
| | | | | 137/494 |
| 1,894,505 | A | * | 1/1933 | Westerman ............... F16K 1/44 |
| | | | | 251/120 |
| 2,717,003 | A | | 9/1955 | Jay et al. |
| 2,984,450 | A | | 5/1961 | Doe |
| 3,153,424 | A | | 10/1964 | Acker et al. |
| 3,545,465 | A | * | 12/1970 | Zadoo .................... B64D 13/02 |
| | | | | 137/38 |
| 6,386,234 | B2 | | 5/2002 | Sontag |
| 6,401,753 | B2 | * | 6/2002 | Neu ........................ F16K 1/443 |
| | | | | 137/625.36 |
| 7,000,635 | B2 | | 2/2006 | Erbe et al. |
| 7,467,641 | B2 | * | 12/2008 | Del Castillo Miro ...................... |
| | | | | F16K 25/005 |
| | | | | 137/375 |
| 9,354,638 | B2 | * | 5/2016 | Rebreanu ................... F16K 1/12 |
| 2011/0094481 | A1 | * | 4/2011 | Zui ....................... F02M 26/67 |
| | | | | 123/568.11 |
| 2012/0235069 | A1 | * | 9/2012 | Richardson ............. F16K 1/487 |
| | | | | 251/366 |

* cited by examiner

POPPET VALVE WITH SIMULTANEOUSLY CONTACTING VALVE MEMBERS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention. The present disclosure relates generally to valves and more specifically relates to poppet valves.

Description of the Related Art. Typical poppet style valves contain a sealing member which contacts an orifice seat to block the flow of media through the valve. The sealing member in contact with the seat creates an area which when acted upon by pressure creates a force that generally is overcome by some form of actuator to open the valve. In some valves, such as high flow (large orifice) valves, this area can become so large that the forces generated become greater than the typical solenoid type actuator can provide. A solution to this in the industry has been to create a poppet valve having two opposing orifices (e.g., of equal or near equal size) which are sealed by two sealing members fixed to a single shaft and operated in unison. In this way, the two opposing seats and sealing members under a common pressure create forces that are opposite to each other, resulting in a more balanced condition with a lower net force that can more easily be overcome by a reasonably sized solenoid actuator.

The difficulty with such a device is in accomplishing an assembly where the two sealing members contact the two orifices simultaneously so as to prevent a leak condition on one of the two seat/sealing member pairs. Conventional valves rely on relatively costly precisely manufactured components such as sleeves to minimize tolerances and accomplish the simultaneous contact of seal members to seats, or on time consuming measuring, shimming or adjusting of components at the time of assembly. For example, U.S. Pat. No. 7,000,635 entitled Double Valve purports to disclose a double-disk actuator with a sleeve disposed between a small disk and a large disk. As another example, U.S. Pat. No. 2,984,450 entitled Valve Seals purports to disclose valve closure members secured on a spindle and having a spacing sleeve disposed between the valve closure members.

Accordingly, a need exists in the art for improved devices, systems and methods for more simply, reliably and cost effectively accomplishing simultaneous contact of two sealing members with their respective seats without resorting to more expensive, complex and time consuming components or assembly methods. The disclosures and teachings herein are directed to devices, systems and methods for improved poppet valves.

BRIEF SUMMARY OF THE INVENTION

In at least one embodiment, a poppet assembly for a valve can include a valve stem for cooperating with a valve actuator, a first valve member coupled to the valve stem in a fixed position and configured to sealingly engage a first orifice and a second valve member coupled to the valve stem and configured to sealingly engage a second orifice. The second valve member can include a coupler for coupling the second valve member to the valve stem and a seal configured to couple to the coupler and the valve stem. The second valve member can be configured for achieving proper spacing between the valve members for simultaneous contact with their respective orifices without the need for more costly and time consuming components or assembly methods.

In at least one embodiment, a poppet assembly for a valve can include a valve stem having a first end for cooperating with a valve actuator and a second end longitudinally opposite the first end, a first valve member coupled to the valve stem in a longitudinally fixed position, wherein the first valve member has a first side configured to sealingly engage a first orifice and a second side opposite the first side, a second valve member coupled to the valve stem, wherein the second valve member has a first side configured to sealingly engage a second orifice and a second side opposite the first side, the second side of the second valve member comprising a first coupler for coupling the second valve member to the valve stem, a seal configured to couple to the first coupler and the valve stem, and a second coupler configured to couple to the first coupler. The valve stem can be disposed at least partially through the second valve member and the first coupler. The first coupler, the second coupler and the seal can be configured to sealingly couple the second valve member to the valve stem. The first valve member can be disposed longitudinally between the second valve member and whichever of the first and second ends of the valve stem is farthest from the second valve member. For instance, a first valve member can be disposed longitudinally between a second valve member and whichever end of a valve stem is configured to operatively couple to or communicate with a valve actuator (e.g., a solenoid actuator).

In at least one embodiment, a seal can be or include an at least partially tubular ferrule configured to be disposed about the valve stem. The first and second couplers can be or include threaded couplers configured to compress the ferrule radially inwardly toward, against or onto the valve stem. One coupler can have male threads and the other coupler can have mating female threads, for example. In at least one embodiment, the first side of the first valve member and the first side of the second valve member can face at least substantially the same direction, in whole or in part. In at least one embodiment, the first side of the first valve member and the first side of the second valve member can face toward the first end of the valve stem. In at least one embodiment, the first side of the first valve member and the first side of the second valve member can face toward the second end of the valve stem. In at least one embodiment, a length of the valve stem between the second side of the first valve member and the first side of the second valve member can be spacerless or sleeveless. In at least one embodiment, a distance between the first valve member and the second valve member or portions thereof can be determined or set in the absence of a spacer or sleeve.

In at least one embodiment, a poppet valve can include a valve body comprising an inlet and an outlet, a first orifice disposed fluidically between the inlet and the outlet, a second orifice disposed fluidically between the inlet and the outlet and a poppet assembly. The second orifice and the first orifice can have a common axis in whole or in part, such as a common longitudinal axis, a common central longitudinal axis, or another common axis according to an implementation of the disclosure. In at least one embodiment, the poppet assembly can include a valve stem having a first end for cooperating with a valve actuator and a second end longitudinally opposite the first end, a first valve member coupled to the valve stem in a longitudinally fixed position, wherein the first valve member has a first side configured to sealingly engage a first orifice and a second side opposite the first side, a second valve member coupled to the valve stem, wherein the second valve member has a first side configured to sealingly engage a second orifice and a second side opposite the first side, the second side of the second valve member comprising a first coupler for coupling the second valve member to the valve stem, a seal configured to couple to the first coupler and the valve stem, and a second coupler configured to couple to the first coupler. The valve stem can be disposed at least partially through the second valve member and the first coupler. The first coupler, the second coupler and the seal can be configured to sealingly couple the second valve member to the valve stem. The first valve member can be disposed longitudinally between the second valve member and whichever of the first and second ends of the valve stem is farthest from the second valve member. For instance, a first valve member can be disposed longitudinally between a second valve member and whichever end of a valve stem is configured to operatively couple to or communicate with a valve actuator (e.g., a solenoid actuator).

In at least one embodiment, a seal can be or include an at least partially tubular ferrule configured to be disposed about the valve stem. The first and second couplers can be or include threaded couplers configured to compress the ferrule radially inwardly toward, against or onto the valve stem. One coupler can have male threads and the other coupler can have mating female threads, for example. In at least one embodiment, the first side of the first valve member and the first side of the second valve member can face at least substantially the same direction, in whole or in part. In at least one embodiment, the first side of the first valve member and the first side of the second valve member can face toward the first end of the valve stem. In at least one embodiment, the first side of the first valve member and the first side of the second valve member can face toward the second end of the valve stem. In at least one embodiment, a length of the valve stem between the second side of the first valve member and the first side of the second valve member can be spacerless or sleeveless. In at least one embodiment, a distance between the first valve member and the second valve member or portions thereof can be determined or set in the absence of a spacer or sleeve.

In at least one embodiment, a poppet valve can include one or more valve actuators coupled to a valve body and operatively coupled with a first, second or other end of a valve stem and configured to move the valve stem and/or one or more other valve components, such as one or more valve members, in at least one direction, which can be or include two or more directions. One or more valve members, such as first and second valve members (and/or additional valve members, if present), can be configured to sealingly engage corresponding first and second orifices or seats (and/or additional orifices or seats, if present), such as simultaneously, at least substantially simultaneously, or in one or more other manners for supporting proper valve function or operation according to an implementation of the disclosure. In at least one embodiment, one or more valve members, such as a second valve member (or a portion thereof), can be configured to be optionally coupled to a valve stem in any one or more of a plurality of different locations along the valve stem relative to another valve member, such as a first valve member (or a portion thereof), which can include one or more of a plurality of different longitudinal locations along a length or portion of the valve stem between the first valve member and an end of the valve stem opposite or farthest from the first valve member.

In at least one embodiment, a poppet valve can include one or more couplers and one or more seals, such as, for example, a first coupler, a second coupler and a first seal, configured to sealingly couple one or more valve members, such as a first, second or other valve member, to a valve stem or to another valve component coupled to a valve stem. In at least one embodiment, one or more couplers and one or more seals can be configured to at least temporarily fix a position of one or more valve members, such as a first, second or other valve member, on or otherwise relative to a valve stem or another valve component coupled to a valve stem. In at least one embodiment, one or more couplers and one or more seals can be configured to sealingly couple and at least temporarily fix a position of a valve member simultaneously.

In at least one embodiment, a poppet valve can include one or more biasing devices, such as a spring, configured to bias one or more valve members, such as first and second valve members, in one or more directions or towards one or more positions, such as towards sealing engagement with one or more corresponding orifices, such as first and second orifices, respectively. In at least one embodiment, a poppet valve can include one or more valve actuators coupled to the valve body and configured to selectively overcome the bias of one or more biasing devices to open the valve. In at least one embodiment, a poppet valve can include one or more biasing devices, such as a spring, configured to bias one or more valve members, such as first and second valve members, in one or more directions or towards one or more positions, such as away from sealing engagement with one or more corresponding orifices, such as first and second orifices, respectively. In at least one embodiment, a poppet valve can include one or more valve actuators coupled to the valve body and configured to selectively overcome the bias of one or more biasing devices to close the valve.

In at least one embodiment, a method of coupling a poppet assembly to a poppet valve having first and second orifices disposed fluidically between a valve inlet and a valve outlet can include disposing a valve stem having a first end for cooperating with a valve actuator and a second end longitudinally opposite the first end at least partially through the first and second orifices, the valve stem having a first valve member coupled thereto in a first longitudinally fixed position and which has a first side configured to sealingly engage the first orifice, disposing a second valve member about the valve stem, wherein the second valve member comprises a first side configured to sealingly engage the second orifice and a second side opposite the first side, and a first coupler for coupling the second valve member to the valve stem, wherein the first coupler can be coupled to the second side of the second valve member, disposing a seal about the valve stem, disposing a second coupler about the valve stem, the second coupler being configured to couple to the first coupler, coupling the first and second couplers, and sealingly coupling the second valve member to the valve stem in a second longitudinally fixed position.

In at least one embodiment, a method can include disposing the valve stem at least partially through the second valve member and the first coupler. A method can include sealingly coupling the seal to the valve stem with the first and second couplers. A method can include disposing the first valve member longitudinally between the first end of the valve stem and the second valve member. A method can include disposing the first valve member longitudinally between the second end of the valve stem and the second valve member. A method can include disposing at least a portion of the second valve member longitudinally between the second orifice and the second end of the valve stem. A method can include disposing at least a portion of the second valve member longitudinally between the second orifice and the first end of the valve stem.

In at least one embodiment, a method can include threadingly coupling the first and second couplers and compressing a tubular ferrule radially inwardly onto the valve stem. A method can include disposing the first side of the first valve member in sealing engagement with the first orifice and disposing the first side of the second valve member in sealing engagement with the second orifice. A method can include applying a force to at least one of the first and second valve members for ensuring sealing engagement with an orifice. A method can include compressing each of the first and second valve members. A method can include holding the second valve member in a fixed position while coupling the first and second couplers. A method can include holding the second valve member in a fixed position while sealingly coupling the second valve member to the valve stem. A method can include holding the first valve member in a fixed position while coupling the first and second couplers. A method can include sealingly coupling the second valve member to the valve stem and establishing the second longitudinally fixed position simultaneously. A method can include establishing the second longitudinally fixed position of the second valve member relative to the first longitudinally fixed position of the first valve member without disposing a spacer between the first and second valve members.

DETAILED DESCRIPTION

Figure 1:
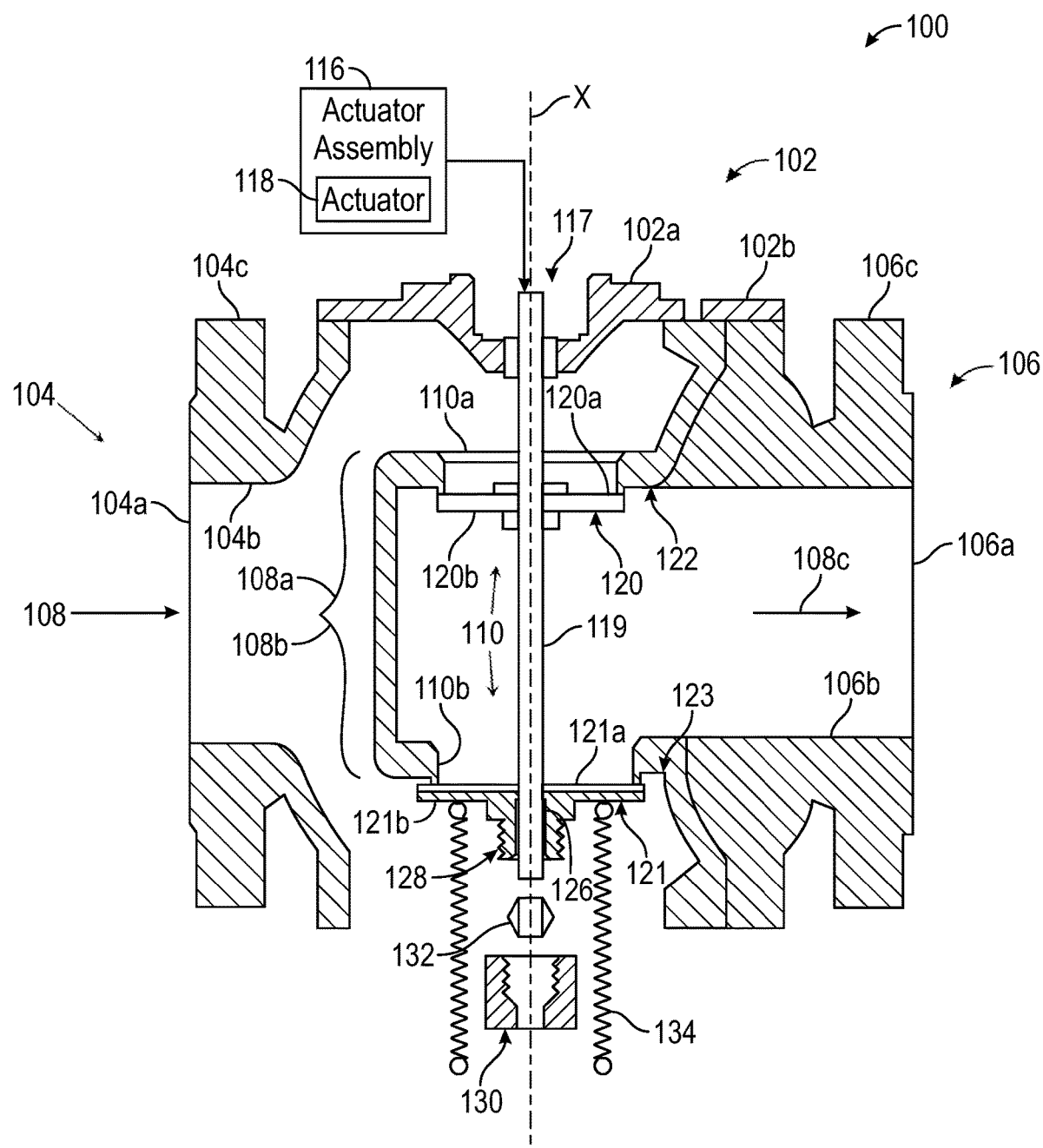
FIG. 1 is a side cross-sectional schematic view of one of many embodiments of a valve according to the disclosure.

The Figures described above and the written description of specific structures and functions below are not presented to limit the scope of what Applicant has invented or the scope of the appended claims. Rather, the Figures and written description are provided to teach any person skilled in the art to make and use the invention(s) for which patent protection is sought. Those skilled in the art will appreciate that not all features of a commercial embodiment of the disclosure are described or shown for the sake of clarity and understanding. Persons of skill in this art will also appreciate that the development of an actual commercial embodiment incorporating aspects of the present disclosure can require numerous implementation-specific decisions to achieve the developer's ultimate goal for the commercial embodiment(s). Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts nevertheless would be a routine undertaking for those of skill in the art having the benefits of this disclosure. The embodiment(s) disclosed and taught herein are susceptible to numerous and various modifications and alternative forms. The use of a singular term, such as, but not limited to, "a," is not intended as limiting of the number of items. The use of relational terms, such as, but not limited to, "top," "bottom," "left," "right," "upper," "lower," "down," "up," "side," "first," "second," ("third" et seq.), "inlet," "outlet" and the like are used in the written description for clarity in specific reference to the Figures and are not intended to limit the scope of the disclosure or the appended claims unless otherwise indicated. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one member with another in a unity fashion. The coupling can occur in any direction, including rotationally. The terms "include" and "such as" are illustrative and not limitative, and the word "can" means "can, but need not" unless otherwise indicated. Notwithstanding any other language in the present disclosure, the embodiment(s) shown in the drawing(s) are examples presented for purposes of illustration and explanation and are not the only embodiments of the subject(s) hereof.

Applicant has created devices, systems and methods for improved poppet valves having advantageous poppets or poppet assemblies and/or having advantageous features for at least partially reducing or minimizing the cost or complexity of poppet valves or portions of poppet valves or the cost, complexity or time involved with the manufacture, assembly or installation of poppet valves or portions of poppet valves. Embodiments of the present disclosure can include, among other things, poppets or poppet assemblies for relatively simply and reliably achieving simultaneous contact or otherwise proper positioning or disposition of two or more valve members or sealing disks relative to one another and to two or more corresponding orifices or valve seats. Applicant has created devices, systems and methods for improved poppet valves having advantageous poppets or poppet assemblies that can be operably positioned and installed without the need for more costly or time consuming measures such as precisely dimensioned spacers or sleeves, precisely measured positioning and the like.

Figure 2:
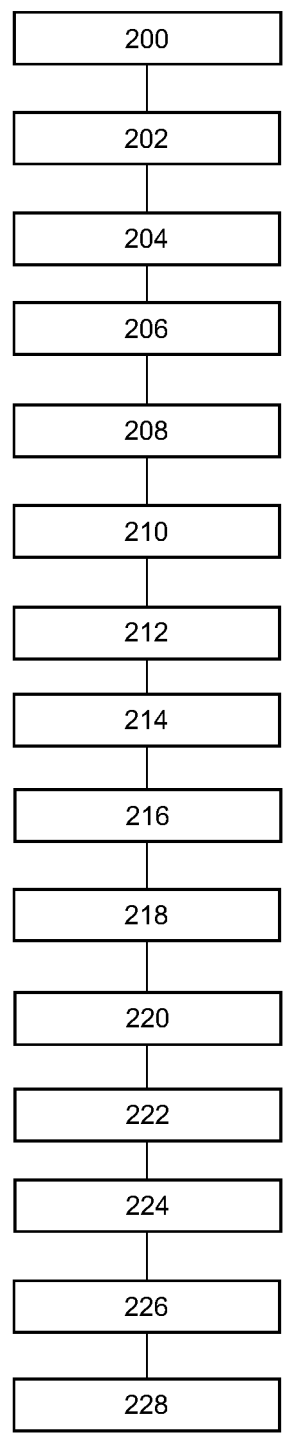
FIG. 2 is a flow chart illustrating one of many embodiments of a method for assembling a poppet valve according to the disclosure.

FIG. 1 is a side cross-sectional schematic view of one of many embodiments of a valve according to the disclosure. FIG. 2 is a flow chart illustrating one of many embodiments of a method for assembling a poppet valve according to the disclosure. FIGS. 1-2 will be described in conjunction with one another.

In at least one embodiment, a poppet valve 100 according to the disclosure can include a valve body 102, such as a casing, encapsulation or housing, for enclosing, protecting or otherwise supporting one or more other valve components, and can include one or more inlets 104 for fluid flow into the valve and one or more outlets 106 for fluid flow out of the valve. Valve body 102 can be a single, unitary body or alternatively can include a plurality of valve body portions coupled together, and can be formed in any shape or manner according to a particular implementation of the disclosure. For example, as shown in the embodiment of FIG. 1 for illustrative purposes, which embodiment is but one of many, body 102 can include a first body portion 102a and a second body portion 102b. Other variations are possible, and valve 100 can include any number of body portions according to a particular implementation, any of which can be coupled with one another in any applicable fashion. For example, valve 100 can, but need not, include one or more couplers (not shown) for coupling two or more valve components together, such as mating threads, other male couplers and/or female couplers, fasteners, receivers, adhesives or other coupling structure(s), separately or in combination.

Inlet 104 can include a plurality of inlet components or other inlet portions coupled together or otherwise disposed in fluid communication with one another and can include one or more inlet openings 104a for allowing fluid flow in one or more directions between the inside and outside of body 102. Opening 104a can be any shape(s) or dimension(s) according to an implementation of the disclosure. Inlet 104 can include an inlet conduit 104b for routing fluid or otherwise allowing fluid to move there through and one or more couplers 104c, which can be or include a separate coupler or an integral coupler portion, in whole or in part, for coupling with other structure in a valve system, such as pipes, tubing, hoses, fluid sources, fluid receivers, fluid destinations or other conduits or components. As shown in FIG. 1 for exemplary purposes, coupler 104c can be or include a flange or ring, but this need not be the case, and coupler 104c (if present) can be or include threads or any other type of fastener, fitting or other coupler now known or future developed, separately or in combination with one another. In at least one embodiment, coupler 104c can be or include a conduit end for joining with one or more other conduits, such as by brazing, welding, friction, adhesion, or in another manner. The foregoing description regarding opening 104a, conduit 104b and coupler 104c can apply similarly to one or more other inlets, outlets and other fluid ways of valve 100. For example, as shown in the exemplary embodiment of FIGS. 1-3, which is but one of many, outlet 106 can include one or more outlet openings 106a, outlet conduits 106b and/or outlet couplers 106c. Alternatively, one or more of these components can be absent, as appropriate in accordance with an implementation of the disclosure. In the relevant field, some may refer to a valve as a "valve fitting," for example, when structure(s) such as conduits 104b, 106b or couplers 104c, 106c are present. As used in the present disclosure, the term "valve" includes "valve fittings" when referring to the device as a whole (e.g., valve 100), unless otherwise indicated.

Valve 100 can include one or more flow passages, such as a valve flow passage, reservoir or other flow path, for routing or otherwise directing fluid through the valve from inlet 104 to outlet 106 (or vice versa). A valve flow passage can include, or at least can be described to include for ease of illustration and explanation, two or more sub-flow passages (or component flow passages) that collectively make up the corresponding flow passage through valve 100. For example, in at least one embodiment, a valve flow passage can include one or more first passages 108a, 108b, such as an inlet or other flow passage, from inlet 104 to a location (which can be any location) along the valve flow passage and one or more second flow passages 108c (collectively with flow passages 108a, 108b, "flow passage 108"), such as an outlet or other flow passage, from such location along flow passage 108 to outlet 106. Valve 100 can include one or more other component flow passages as may be described in further detail elsewhere herein, separately or in combination with one another and/or any of first and second flow passages. Further, each component flow passage, such as first and second flow passages, can comprise a plurality of shorter passages or other paths (i.e., sub-sub-passages) between two or more locations or points along flow passage 108 or a portion thereof. Inlet 104, outlet 106 and flow passage 108 can, but need not, have a common axis, such as central longitudinal axis, separately or in combination, in whole or in part.

Valve 100 can include one or more orifices 110, such as structure defining or otherwise including an opening, conduit or other passageway, for at least partially routing or otherwise affecting flow through the valve. Orifice 110 can be disposed at least partially within flow passage 108, such as fluidically between inlet 104 and outlet 106, and can house or otherwise cooperate with at least a portion of one or more sealing components of the valve (further described below). Orifice 110 can be configured for routing or otherwise allowing fluid to flow between inlet 104 and outlet 106 along flow passage 108, which can include by way of routing or allowing fluid to flow around or otherwise past one or more sealing components or other valve components disposed at least partially in flow passage 108. For example, in at least one embodiment, orifice 110 can have a larger flow area or volume than one or more other portions of flow passage 108, which can include having a flow area or volume sufficient to allow fluid to flow through orifice 110 around or past one or more components disposed at least partially within orifice 110, such as when valve 100 is in an open position. Orifice 110 can, but need not, include a plurality of openings or other flow paths for defining a portion of one or more flow passages of valve 100, such as, for example, an orifice flow passage forming a part of flow passage 108 from one or more orifice inlets 110a for allowing fluid to enter the orifice to one or more orifice outlets 110b for allowing fluid to exit the orifice.

Valve 100 can include an actuator assembly 116 for controlling fluid flow through at least a portion of valve 100, separately or in cooperation with one or more other valve components. Actuator assembly 116 can be coupled to valve body 102, in whole or in part, such as to one or more of first and second body portions 102a, 102b, and can, but need not, include additional body structure, such as an actuator housing (not shown) for housing or otherwise supporting one or more actuation components. In at least one embodiment, actuator assembly 116 can include one or more poppets or poppet assemblies 117, which can include a stem 119 and one or more valve members 120, 121, and one or more actuators 118 for moving and/or retaining (or otherwise holding) stem 119 and valve member(s) 120, 121 to, from or in one or more positions. One or more valve members 120, 121 can have a first side 120a, 121a and a second side 120b, 121b and can have any number of positions relative to body 102 or another valve portion according to a particular implementation of the disclosure. For example, valve members 120, 121 can have a fully closed position for maximizing resistance to flow through at least a portion of valve 100, which can include preventing flow there through. As another example, valve members 120, 121 can have a fully open position for minimizing resistance to flow through at least a portion of valve 100, such as by minimizing flow resistance caused by valve members 120, 121 or a portion thereof. Valve members 120, 121 can have one or more partially open (or partially closed) positions between the fully open and fully closed positions for allowing fluid flow at one or more rates between a maximum and a minimum flow rate, which can be any flow rate(s) according to an embodiment or implementation at hand.

Stem 119, such as a rod, shaft, or other support member(s), can be or include structure for holding one or more valve members 120,121 in one or more positions and for moving such valve member(s) among positions, such as between two or more of the positions described above, such as in cooperation with actuator 118. For example, in the exemplary embodiment of FIG. 1, actuator 118 can move poppet assembly 117 between or among a fully closed position (illustrated in FIG. 1) and one or more transitional and open positions. In such an embodiment, which is but one of many, valve 100 can include one or more valve seats 122, 123 for optionally coupling with one or more corresponding valve members 120, 121 to limit or prevent fluid flow through corresponding orifices 110 of valve 100. Valve seats 122, 123 can be disposed at orifice inlets 110a and, in at least one embodiment, can be coupled to orifice 110 and/or body 102 in a fixed or stationary position. Valve seats 122, 123 can be unitary or can include two or more valve seats or valve seat portions. Valve members 120, 121 and seats 122, 123 can be configured to sealingly couple with one another for preventing or otherwise limiting fluid flow through one or more portions of flow passage 108, such as through orifices 110, in whole or in part. For instance, valve members 120, 121 can have one or more sides (e.g., first sides 120a, 121a) or other portions for sealingly engaging seats 122, 123 or portions thereof (e.g., an upstream or downstream side). For example, valve members 120, 121 can be or include sealing disks or stoppers configured to sealingly engage a corresponding one of seats 122, 123. In at least one embodiment, valve 100 can have a fully closed position wherein valve members 120, 121 and seats 122, 123 are sealingly engaged for preventing flow into and/or through orifices 110 and one or more open positions wherein valve members 120, 121 and seats 122, 123 are not sealingly engaged and, rather, are disposed relative to one another for allowing fluid flow. Valve members 120, 121 or portions thereof can be configured to seal with seats 122, 123 in any sealing manner or configuration according to a particular implementation of the disclosure, which can include first sides 120a, 121a being shaped or otherwise configured to mate with seats 122, 123 in fluid-tight engagement.

In at least one embodiment, orifice inlets 110a can be the same size or at least substantially the same size. In at least one embodiment, orifice inlets 110a can be of different sizes. For instance, one can be larger than the other. In at least one embodiment, valve members 120, 121 can be the same size or at least substantially the same size. In at least one embodiment, valve members 120, 121 can be of different sizes. For instance, one can be larger than the other. In at least one embodiment, valve seats 122, 123 can be the same size or at least substantially the same size. In at least one embodiment, valve seats 122, 123 can be of different sizes. For instance, one can be larger than the other. For example, as shown in the illustrative embodiment of FIG. 1 for exemplary purposes, valve member 120 and valve seat 122 can be smaller than valve member 121 and valve seat 123. In such an embodiment, which is but one of many, such sizing can allow for valve member 120 to be inserted into valve body 102 through orifice inlet 110b and valve seat 123 during assembly or installation of poppet assembly 117. In at least one embodiment, orifice inlets 110a and/or seats 122, 123 can have one or more common axes, which can include having a common central longitudinal axis X.

In at least one embodiment, one or more valve members, such as valve member 120, can be coupled to stem 119 in a temporarily or permanently fixed position along the length of stem 119 for cooperating with valve seat 123 during valve operations. Valve member 120 can be coupled to stem 119 in any manner according to an implementation of the disclosure, including without limitation by way of being formed integrally therewith or being formed separately therefrom and mechanically or otherwise coupled thereto, separately or in combination, in whole or in part. Such coupling can, but need not, include the use of one or more couplers or other structures such as shoulders, stops, grooves, set screws, pins or the like.

In at least one embodiment, one or more other valve members, such as valve member 121, advantageously can be configured for being slideably or otherwise movably disposed along a length of valve stem 119 and selectively coupled to valve stem 119 in any of a plurality of different longitudinal positions in order to facilitate simultaneous coupling of valve member 121 to stem 119 and positioning of valve member 121 relative to valve member 120 and valve seat 123 for proper valve functionality. In other words, with regard to the exemplary embodiment of FIG. 1, a person of ordinary skill in the art having the benefits of the present disclosure will understand that, while some leeway or room for error can exist in a real world implementation of a valve 100 according to the disclosure, valve members 120, 121 ideally should sealingly engage or disengage valve seats 122, 123, respectively, at exactly the same time during valve operations in order to support or achieve proper valve functionality. This can be particularly true with regard to the fully closed position because if valve members 120, 121 are not appropriately positioned on stem 119 for simultaneous contact with their respective seats 122, 123, then one valve member 120, 121 can fully seat during closing while the other does not, resulting in a leak condition. In at least one embodiment, one or more other valve members, such as valve member 121, advantageously can be configured for minimizing or avoiding such a problem without resorting to relatively more complex and time consuming manners of ensuring that the spacing between valve members 120, 121 operatively matches the spacing between valve seats 122, 123 (which, once again, can vary from valve to valve—even among valves of the same type and size—in real world implementations, such as due to slight differences resulting from manufacturing tolerances, etc.).

More specifically, in at least one embodiment, valve member 121 can be at least partially tubular and can be configured to be slidingly disposed on or about stem 119 such that at least a portion of stem 119 passes into or through at least a portion of valve member 121, such as via a bore 126. Valve member 121 can include one or more couplers for fixing a position of valve member 121 along stem 119. For example, valve member 121 can include a first coupler 128 formed on or otherwise coupled to side 121b and a second coupler 130 configured to coupler with first coupler 128. As shown in FIG. 1 for illustrative purposes, couplers 128, 130 can be or include threaded couplers. However, this need not be the case and other types of couplers are possible, such as quarter-turn couplers and press fit couplers, among others. Valve member 121 can further include one or more seals 132, such as an elastomeric or metal (e.g., brass) ferule for cooperating with one or more of couplers 128, 130. For instance, in at least one embodiment, seal 132 can be disposed between couplers 128, 130 about stem 119 and couplers 128, 130 can be configured to plastically or elastically deform or crush seal 132 radially inwardly onto the exterior surface of stem 119 for fixing the position of valve member 121 relative to stem 119. In this manner, valve member 121 can be configured to allow the adjustable placement and coupling of valve member 121 onto stem 119 during assembly or adjustment of poppet assembly 117 or valve 100.

In at least one embodiment, valve 100 or a portion thereof, such as actuator assembly 116, can include one or more biasing devices, such as one or more springs 134, for biasing poppet assembly 117 or a portion thereof, such as valve members 120, 121 or stem 119, in one or more directions, which can include a direction opposite or otherwise opposed to forces exerted by an actuator 118. For example, spring 134 or another biasing device(s) can bias poppet assembly 117 in an upward direction (with reference to the exemplary orientation of FIG. 1) and valve 100 can be configured as a normally closed valve wherein actuator 118 can be configured to move poppet assembly 117 downwardly to open the valve. As another example, spring 134 or another biasing device(s) can bias poppet assembly 117 in a downward direction (with reference to the exemplary orientation of FIG. 1) and valve 100 can be configured as a normally open valve wherein actuator 118 can be configured to move poppet assembly 117 upwardly to open the valve. As yet another example, actuator 118 can be disposed beneath valve body 102 instead of above valve body 102 as shown for exemplary purposes in FIG. 1. Further, in either actuator configuration, actuator 118 can be a push style actuator or a pull style actuator and valve seats 122, 123 can be on the top or the bottom of orifice openings 110a, as desired or required according to an implementation of the disclosure. Similarly, actuator 118 can be or include any type(s) of actuator according to an implementation of the disclosure and can include, for example, at least one of an electrohydraulic actuator, an electromechanical actuator, a pump, an electric motor, a stepper motor, a gear box, an electromagnet, a solenoid, a pilot valve and a combination thereof. Whether separately or in combination with any of the foregoing, embodiments of the present disclosure can include a plurality of sealing components for resisting fluid flow through a plurality of corresponding seats or orifices when the valve is in one or more positions, which can include two valve members 120, 121 as illustrated in FIG. 1 or which can include more than two valve members and corresponding seats or orifices.

With continuing reference to the Figures and particular reference to FIG. 2, one or more methods according to the disclosure will now be described in more detail. As will be appreciated in light of the foregoing description of valve 100 and the components thereof, in at least one embodiment, a method can include disposing 200 a valve stem with a fixed valve member into a valve body and disposing 202 the fixed valve member in sealing communication with a first valve seat. A method can include placing 204 a second valve member over or about the valve stem and sliding 206 the second valve member into sealing communication with a second valve seat. A method can include applying 208 force to one or more valve members and ensuring 210 the one or more valve members are in sealing contact with respective valve seats. A method can include at least partially compressing 212 one or more valve members, which can include compressing two or more valve members with equal or at least substantially equal force or pressure. A method can include placing 214 a seal over or about the valve stem and sliding 216 the seal into a seal receiving portion or other engagement with one or more valve members. A method can include placing 216 one or more couplers, such as a compression nut, over or about the valve stem and at least partially coupling 218 a coupler to a valve member or a coupler coupled to a valve member. A method can include holding 220 a valve member, such as while two or more valve members are situated on respective seats or orifices, and tightening 222 one or more couplers onto a valve member or a coupler coupled to a valve member. A method can include deforming 224 one or more seals or couplers, such as by plastically or elastically crushing or compressing such seals and/or couplers. A method can include sealing 226 and locking 228 a valve member to the stem, which can include doing so simultaneously. Accordingly, two or more valve members can be fixed to the valve stem and simultaneously disposed in contact with their respective orifices or seats.

In at least one embodiment, a poppet assembly for a valve can include a valve stem for cooperating with a valve actuator, a first valve member coupled to the valve stem in a fixed position and configured to sealingly engage a first orifice and a second valve member coupled to the valve stem and configured to sealingly engage a second orifice. The second valve member can include a coupler for coupling the second valve member to the valve stem and a seal configured to couple to the coupler and the valve stem. The second valve member can be configured for achieving proper spacing between the valve members for simultaneous contact with their respective orifices without the need for more costly and time consuming components or assembly methods.

In at least one embodiment, a poppet assembly for a valve can include a valve stem having a first end for cooperating with a valve actuator and a second end longitudinally opposite the first end, a first valve member coupled to the valve stem in a longitudinally fixed position, wherein the first valve member has a first side configured to sealingly engage a first orifice and a second side opposite the first side, a second valve member coupled to the valve stem, wherein the second valve member has a first side configured to sealingly engage a second orifice and a second side opposite the first side, the second side of the second valve member comprising a first coupler for coupling the second valve member to the valve stem, a seal configured to couple to the first coupler and the valve stem, and a second coupler configured to couple to the first coupler. The valve stem can be disposed at least partially through the second valve member and the first coupler. The first coupler, the second coupler and the seal can be configured to sealingly couple the second valve member to the valve stem. The first valve member can be disposed longitudinally between the second valve member and whichever of the first and second ends of the valve stem is farthest from the second valve member. For instance, a first valve member can be disposed longitudinally between a second valve member and whichever end of a valve stem is configured to operatively couple to or communicate with a valve actuator (e.g., a solenoid actuator).

In at least one embodiment, a seal can be or include an at least partially tubular ferrule configured to be disposed about the valve stem. The first and second couplers can be or include threaded couplers configured to compress the ferrule radially inwardly toward, against or onto the valve stem. One coupler can have male threads and the other coupler can have mating female threads, for example. In at least one embodiment, the first side of the first valve member and the first side of the second valve member can face at least substantially the same direction, in whole or in part. In at least one embodiment, the first side of the first valve member and the first side of the second valve member can face toward the first end of the valve stem. In at least one embodiment, the first side of the first valve member and the first side of the second valve member can face toward the second end of the valve stem. In at least one embodiment, a length of the valve stem between the second side of the first valve member and the first side of the second valve member can be spacerless or sleeveless. In at least one embodiment, a distance between the first valve member and the second valve member or portions thereof can be determined or set in the absence of a spacer or sleeve.

In at least one embodiment, a poppet valve can include a valve body comprising an inlet and an outlet, a first orifice disposed fluidically between the inlet and the outlet, a second orifice disposed fluidically between the inlet and the outlet and a poppet assembly. The second orifice and the first orifice can have a common axis in whole or in part, such as a common longitudinal axis, a common central longitudinal axis, or another common axis according to an implementation of the disclosure. In at least one embodiment, the poppet assembly can include a valve stem having a first end for cooperating with a valve actuator and a second end longitudinally opposite the first end, a first valve member coupled to the valve stem in a longitudinally fixed position, wherein the first valve member has a first side configured to sealingly engage a first orifice and a second side opposite the first side, a second valve member coupled to the valve stem, wherein the second valve member has a first side configured to sealingly engage a second orifice and a second side opposite the first side, the second side of the second valve member comprising a first coupler for coupling the second valve member to the valve stem, a seal configured to couple to the first coupler and the valve stem, and a second coupler configured to couple to the first coupler. The valve stem can be disposed at least partially through the second valve member and the first coupler. The first coupler, the second coupler and the seal can be configured to sealingly couple the second valve member to the valve stem. The first valve member can be disposed longitudinally between the second valve member and whichever of the first and second ends of the valve stem is farthest from the second valve member. For instance, a first valve member can be disposed longitudinally between a second valve member and whichever end of a valve stem is configured to operatively couple to or communicate with a valve actuator (e.g., a solenoid actuator).

In at least one embodiment, a seal can be or include an at least partially tubular ferrule configured to be disposed about the valve stem. The first and second couplers can be or include threaded couplers configured to compress the ferrule radially inwardly toward, against or onto the valve stem. One coupler can have male threads and the other coupler can have mating female threads, for example. In at least one embodiment, the first side of the first valve member and the first side of the second valve member can face at least substantially the same direction, in whole or in part. In at least one embodiment, the first side of the first valve member and the first side of the second valve member can face toward the first end of the valve stem. In at least one embodiment, the first side of the first valve member and the first side of the second valve member can face toward the second end of the valve stem. In at least one embodiment, a length of the valve stem between the second side of the first valve member and the first side of the second valve member can be spacerless or sleeveless. In at least one embodiment, a distance between the first valve member and the second valve member or portions thereof can be determined or set in the absence of a spacer or sleeve.

In at least one embodiment, a poppet valve can include one or more valve actuators coupled to a valve body and operatively coupled with a first, second or other end of a valve stem and configured to move the valve stem and/or one or more other valve components, such as one or more valve members, in at least one direction, which can be or include two or more directions. One or more valve members, such as first and second valve members (and/or additional valve members, if present), can be configured to sealingly engage corresponding first and second orifices or seats (and/or additional orifices or seats, if present), such as simultaneously, at least substantially simultaneously, or in one or more other manners for supporting proper valve function or operation according to an implementation of the disclosure. In at least one embodiment, one or more valve members, such as a second valve member (or a portion thereof), can be configured to be optionally coupled to a valve stem in any one or more of a plurality of different locations along the valve stem relative to another valve member, such as a first valve member (or a portion thereof), which can include one or more of a plurality of different longitudinal locations along a length or portion of the valve stem between the first valve member and an end of the valve stem opposite or farthest from the first valve member.

In at least one embodiment, a poppet valve can include one or more couplers and one or more seals, such as, for example, a first coupler, a second coupler and a first seal, configured to sealingly couple one or more valve members, such as a first, second or other valve member, to a valve stem or to another valve component coupled to a valve stem. In at least one embodiment, one or more couplers and one or more seals can be configured to at least temporarily fix a position of one or more valve members, such as a first, second or other valve member, on or otherwise relative to a valve stem or another valve component coupled to a valve stem. In at least one embodiment, one or more couplers and one or more seals can be configured to sealingly couple and at least temporarily fix a position of a valve member simultaneously.

In at least one embodiment, a poppet valve can include one or more biasing devices, such as a spring, configured to bias one or more valve members, such as first and second valve members, in one or more directions or towards one or more positions, such as towards sealing engagement with one or more corresponding orifices, such as first and second orifices, respectively. In at least one embodiment, a poppet valve can include one or more valve actuators coupled to the valve body and configured to selectively overcome the bias of one or more biasing devices to open the valve. In at least one embodiment, a poppet valve can include one or more biasing devices, such as a spring, configured to bias one or more valve members, such as first and second valve members, in one or more directions or towards one or more positions, such as away from sealing engagement with one or more corresponding orifices, such as first and second orifices, respectively. In at least one embodiment, a poppet valve can include one or more valve actuators coupled to the valve body and configured to selectively overcome the bias of one or more biasing devices to close the valve.

In at least one embodiment, a method of coupling a poppet assembly to a poppet valve having first and second orifices disposed fluidically between a valve inlet and a valve outlet can include disposing a valve stem having a first end for cooperating with a valve actuator and a second end longitudinally opposite the first end at least partially through the first and second orifices, the valve stem having a first valve member coupled thereto in a first longitudinally fixed position and which has a first side configured to sealingly engage the first orifice, disposing a second valve member about the valve stem, wherein the second valve member comprises a first side configured to sealingly engage the second orifice and a second side opposite the first side, and a first coupler for coupling the second valve member to the valve stem, wherein the first coupler can be coupled to the second side of the second valve member, disposing a seal about the valve stem, disposing a second coupler about the valve stem, the second coupler being configured to couple to the first coupler, coupling the first and second couplers, and sealingly coupling the second valve member to the valve stem in a second longitudinally fixed position.

In at least one embodiment, a method can include disposing the valve stem at least partially through the second valve member and the first coupler. A method can include sealingly coupling the seal to the valve stem with the first and second couplers. A method can include disposing the first valve member longitudinally between the first end of the valve stem and the second valve member. A method can include disposing the first valve member longitudinally between the second end of the valve stem and the second valve member. A method can include disposing at least a portion of the second valve member longitudinally between the second orifice and the second end of the valve stem. A method can include disposing at least a portion of the second valve member longitudinally between the second orifice and the first end of the valve stem.

In at least one embodiment, a method can include threadingly coupling the first and second couplers and compressing a tubular ferrule radially inwardly onto the valve stem. A method can include disposing the first side of the first valve member in sealing engagement with the first orifice and disposing the first side of the second valve member in sealing engagement with the second orifice. A method can include applying a force to at least one of the first and second valve members for ensuring sealing engagement with an orifice. A method can include compressing each of the first and second valve members. A method can include holding the second valve member in a fixed position while coupling the first and second couplers. A method can include holding the second valve member in a fixed position while sealingly coupling the second valve member to the valve stem. A method can include holding the first valve member in a fixed position while coupling the first and second couplers. A method can include sealingly coupling the second valve member to the valve stem and establishing the second longitudinally fixed position simultaneously. A method can include establishing the second longitudinally fixed position of the second valve member relative to the first longitudinally fixed position of the first valve member without disposing a spacer between the first and second valve members.

Other and further embodiments utilizing one or more aspects of the devices, systems and methods disclosed herein can be devised without departing from the spirit of Applicant's disclosure. For example, the devices, systems and methods disclosed herein can be used alone or to form one or more parts of other valves, valve components and/or fluid control systems. Further, the various methods and embodiments of the poppets and valves can be included in combination with each other to produce variations of the disclosed methods and embodiments. Discussion of singular elements can include plural elements and vice-versa. References to at least one item followed by a reference to the item can include one or more items. Also, various aspects of the embodiments can be used in conjunction with each other to accomplish the understood goals of the disclosure.

Unless the context requires otherwise, the words "comprise," "include," and "has" (including variations and conjugations thereof, such as "comprises," "including," "have" and so forth) should be understood to imply the inclusion of at least the stated element or step or group of elements or steps or equivalents thereof, and not the exclusion of a greater numerical quantity or any other element or step or group of elements or steps or equivalents thereof. The devices, apparatuses and systems can be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components and/or can be combined into components having multiple functions. The term "fluid(s)" as used herein includes any substance or material capable of flowing, such as, for example, liquid(s), gas(es) and combinations thereof (regardless of whether one or more solids or other non-fluids may be present therein).

The embodiments have been described in the context of preferred and other embodiments and not every embodiment of Applicant's disclosure has been described. Obvious modifications and alterations to the described embodiments are available to those of ordinary skill in the art having the benefits of the present disclosure. The disclosed and undisclosed embodiments are not intended to limit or restrict the scope or applicability of Applicant's disclosures, but rather, in conformity with the patent laws, Applicant intends to fully protect all such modifications and improvements that come within the scope or range of equivalents of the claims.

What is claimed is:

1. A poppet valve, comprising:
    a valve body comprising an inlet and an outlet;
    a first orifice disposed fluidically between the inlet and the outlet;
    a second orifice disposed fluidically between the inlet and the outlet, wherein the second orifice and the first orifice have a common central longitudinal axis; and
    a poppet assembly comprising
        a valve stem having a first end for cooperating with a valve actuator and a second end longitudinally opposite the first end;
        a first valve member coupled to the valve stem in a longitudinally fixed position and having a first side configured to sealingly engage the first orifice and a second side opposite the first side;
        a second valve member coupled to the valve stem, wherein the second valve member has a first side configured to sealingly engage the second orifice and a second side opposite the first side;
        a first coupler for coupling the second valve member to the valve stem, wherein the first coupler is coupled to the second side of the second valve member;
        a seal configured to couple to the first coupler and the valve stem; and
        a second coupler configured to couple to the first coupler;
        wherein the valve stem is disposed at least partially through the second valve member and the first coupler;

wherein the first coupler, the second coupler and the seal are configured to sealingly couple the second valve member to the valve stem;

wherein the first valve member is disposed longitudinally between the second valve member and whichever of the first and second ends of the valve stem is farthest from the second valve member;

wherein the second valve member is configured to be coupled to the valve stem in any of a plurality of different locations along the valve stem relative to the first valve member; and wherein the seal is a tubular ferrule disposed about the valve stem and wherein the first and second couplers are threaded couplers configured to compress the ferrule radially inwardly onto the valve stem.

2. The poppet valve of claim 1, wherein the first side of the first valve member and the first side of the second valve member face the same direction.

3. The poppet valve of claim 2, wherein the first side of the first valve member and the first side of the second valve member face toward the first end of the valve stem.

4. The poppet valve of claim 2, wherein a length of the valve stem between the second side of the first valve member and the first side of the second valve member is spacerless.

5. The poppet valve of claim 1, further comprising the valve actuator, wherein the valve actuator is coupled to the valve body and the first end of the valve stem and configured to move the valve stem in at least one direction.

6. The poppet valve of claim 1, wherein the first and second valve members are configured to sealingly engage the first and second orifices simultaneously.

7. The poppet valve of claim 1, wherein the first coupler, the second coupler and the seal are configured to sealingly couple the second valve member to the valve stem and to at least temporarily fix a position of the second valve member on the valve stem simultaneously.

8. The poppet valve of claim 1, further comprising at least one spring configured to bias the first and second valve members toward sealing engagement with the first and second orifices, respectively.

9. The poppet valve of claim 8, further comprising the valve actuator, wherein the valve actuator is coupled to the valve body and configured to selectively overcome the bias of the at least one spring to open the valve.

10. The poppet valve of claim 1, further comprising at least one spring configured to bias the first and second valve members away from sealing engagement with the first and second orifices, respectively.

11. The poppet valve of claim 10, further comprising the valve actuator, wherein the valve actuator is coupled to the valve body and configured to selectively overcome the bias of the at least one spring to close the valve.

12. A method of assembling a poppet valve comprising a valve body comprising an inlet and an outlet;
a first orifice disposed fluidically between the inlet and the outlet;
a second orifice disposed fluidically between the inlet and the outlet, wherein the second orifice and the first orifice have a common central longitudinal axis; and
a poppet assembly comprising
a valve stem having a first end for cooperating with a valve actuator and a second end longitudinally opposite the first end;
a first valve member coupled to the valve stem in a longitudinally fixed position and having a first side configured to sealingly engage the first orifice and a second side opposite the first side;
a second valve member coupled to the valve stem, wherein the second valve member has a first side configured to sealingly engage the second orifice and a second side opposite the first side;
a first coupler for coupling the second valve member to the valve stem, wherein the first coupler is coupled to the second side of the second valve member;
a seal configured to couple to the first coupler and the valve stem; and
a second coupler configured to couple to the first coupler;
wherein the valve stem is disposed at least partially through the second valve member and the first coupler;
wherein the first coupler, the second coupler and the seal are configured to sealingly couple the second valve member to the valve stem;
wherein the first valve member is disposed longitudinally between the second valve member and whichever of the first and second ends of the valve stem is farthest from the second valve member; and
wherein the second valve member is configured to be selectively coupled to the valve stem in any of a plurality of different locations along the valve stem relative to the first valve member, the method comprising:
disposing the valve stem at least partially through the first and second orifices;
disposing the second valve member about the valve stem;
disposing the seal about the valve stem;
disposing the second coupler about the valve stem;
coupling the first and second couplers;
sealingly coupling the second valve member to the valve stem in a second longitudinally fixed position; and
threadingly coupling the first and second couplers and compressing the seal radially inwardly onto the valve stem.

13. The method of claim 12, further comprising disposing the valve stem at least partially through the second valve member and the first coupler.

14. The method of claim 12, further comprising sealingly coupling the seal to the valve stem with the first and second couplers.

15. The method of claim 12, further comprising:
disposing the first side of the first valve member in sealing engagement with the first orifice; and
disposing the first side of the second valve member in sealing engagement with the second orifice.

16. The method of claim 12, further comprising sealingly coupling the second valve member to the valve stem and establishing the second longitudinally fixed position simultaneously.

17. A poppet valve, comprising:
a valve body comprising an inlet and an outlet;
a first orifice disposed fluidically between the inlet and the outlet;
a second orifice disposed fluidically between the inlet and the outlet, wherein the second orifice and the first orifice have a common central longitudinal axis; and
a poppet assembly comprising
a valve stem having a first end for cooperating with a valve actuator and a second end longitudinally opposite the first end;

a first valve member coupled to the valve stem in a longitudinally fixed position and having a first side configured to sealingly engage the first orifice and a second side opposite the first side;

a second valve member coupled to the valve stem, wherein the second valve member has a first side configured to sealingly engage the second orifice and a second side opposite the first side;

a first coupler for coupling the second valve member to the valve stem, wherein the first coupler is coupled to the second side of the second valve member;

a seal configured to couple to the first coupler and the valve stem; and a second coupler configured to threadingly couple to the first coupler and to compress the seal radially inwardly onto the valve stem;

wherein the valve stem is disposed at least partially through the second valve member and the first coupler;

wherein the first coupler, the second coupler and the seal are configured to sealingly couple the second valve member to the valve stem in any of a plurality of different locations along the valve stem relative to the first valve member; and wherein the first valve member is disposed longitudinally between the second valve member and whichever of the first and second ends of the valve stem is farthest from the second valve member.

18. The poppet valve of claim 17, wherein a distance between the first valve member and the second valve member is set without a spacer.

* * * * *